(12) United States Patent
Oka et al.

(10) Patent No.: US 7,110,837 B2
(45) Date of Patent: Sep. 19, 2006

(54) CONTROL SYSTEM AND METHOD FOR ON-LINE EDITING OF USER PROGRAM

(75) Inventors: Minoru Oka, Mishima (JP); Jintaro Deki, Mishima (JP); Koji Yaoita, Tokyo (JP); Katsuhiko Ichimura, Yokohama (JP); Akio Ono, Numazu (JP)

(73) Assignee: OMRON Corporation, Kyoto (JP)

( * ) Notice: Subject to any disclaimer, the term of this patent is extended or adjusted under 35 U.S.C. 154(b) by 20 days.

(21) Appl. No.: 10/799,930

(22) Filed: Mar. 12, 2004

(65) Prior Publication Data

US 2004/0230322 A1 Nov. 18, 2004

(30) Foreign Application Priority Data

Mar. 13, 2003 (JP) ............................. 2003-068920
Mar. 3, 2004 (JP) ............................. 2004-059865

(51) Int. Cl.
*G05B 19/42* (2006.01)
*G05B 11/01* (2006.01)
*G05B 9/02* (2006.01)
*G06F 13/00* (2006.01)
*G06F 12/00* (2006.01)
*G06F 12/12* (2006.01)
*G06F 12/16* (2006.01)

(52) U.S. Cl. ............................. 700/87; 700/18; 700/21; 700/82; 700/88; 710/23; 710/26; 710/28; 711/154; 711/159; 711/165

(58) Field of Classification Search ................... 700/18, 700/21, 79, 82, 86–88; 711/117–120, 143, 711/148, 165, 170, 173, 147, 153–155, 159; 710/22–24, 26, 28; 717/110–113
See application file for complete search history.

(56) References Cited

U.S. PATENT DOCUMENTS 4,542,452 A * 9/1985 Fukai et al. .................. 700/12

(Continued)

FOREIGN PATENT DOCUMENTS

JP 59142792 A * 8/1984

(Continued)

OTHER PUBLICATIONS

Patent Abstract of Japan 9-244717 (Sep. 19, 1997).

(Continued)

*Primary Examiner*—Crystal J. Barnes
(74) *Attorney, Agent, or Firm*—Beyer Weaver & Thomas LLP

(57) ABSTRACT

A control system includes a programmable controller having a CPU unit that carries out cyclic operations of processes. An additional temporary user memory is provided in addition to a regular user memory. When an on-line editing of a user program is to be carried out, the program is stored in both memories and the program stored in the temporary memory is called by an instruction execution engine to be executed. After the on-line editing is completed on the user program stored in the user memory, the program execution is based on the edited user program stored in the user memory.

9 Claims, 8 Drawing Sheets

U.S. PATENT DOCUMENTS

| | | | |
|---|---|---|---|
| 4,745,572 A * | 5/1988 | Wilburn | 710/36 |
| 4,755,997 A * | 7/1988 | Takahashi | 714/38 |
| 5,321,603 A * | 6/1994 | Schwenke | 700/17 |
| 5,600,807 A * | 2/1997 | Itoh et al. | 711/211 |
| 5,659,705 A * | 8/1997 | McNutt et al. | 711/115 |
| 6,311,101 B1 | 10/2001 | Kastner | |
| 6,480,762 B1 * | 11/2002 | Uchikubo et al. | 700/253 |
| 6,584,540 B1 * | 6/2003 | Shinmori | 711/103 |
| 6,819,960 B1 * | 11/2004 | McKelvey et al. | 700/17 |
| 2002/0194527 A1 * | 12/2002 | Murai et al. | 714/6 |
| 2003/0144753 A1 * | 7/2003 | Otani et al. | |
| 2005/0177709 A1 * | 8/2005 | Kim | 713/1 |

FOREIGN PATENT DOCUMENTS

| | | |
|---|---|---|
| JP | 05080813 A * | 4/1993 |
| JP | 9-120306 | 5/1997 |
| WO | WO 8204136 A * | 11/1982 |
| WO | 01/69335 | 9/2001 |

OTHER PUBLICATIONS

Patent Abstract of Japan 9-305383 (Nov. 28, 1997).
European Search Report, Application No. EP04005787, Jul. 2, 2004.

* cited by examiner

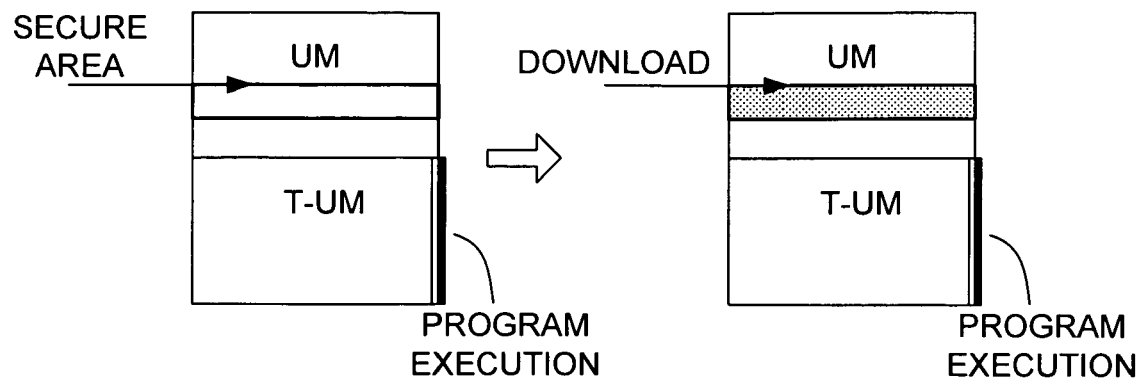
FIG. 7A  FIG. 7B
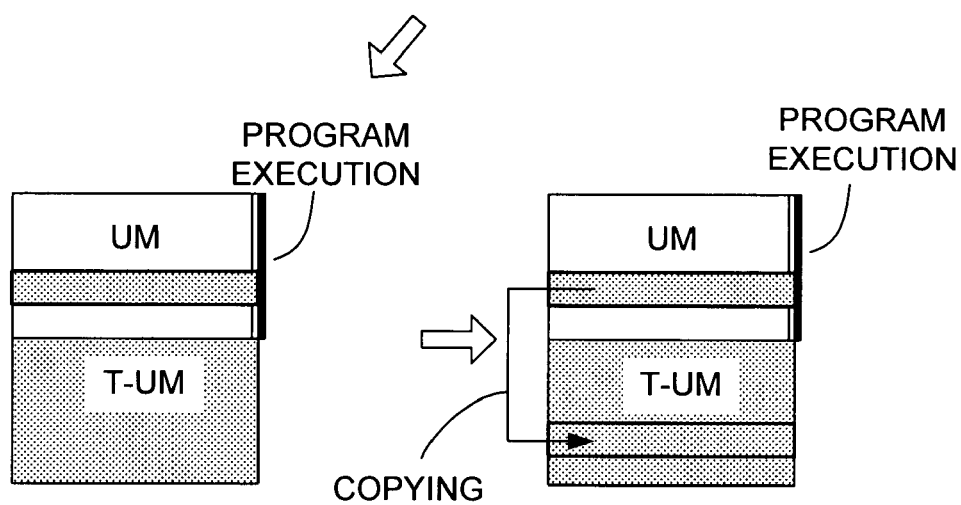
FIG. 7C  FIG. 7D

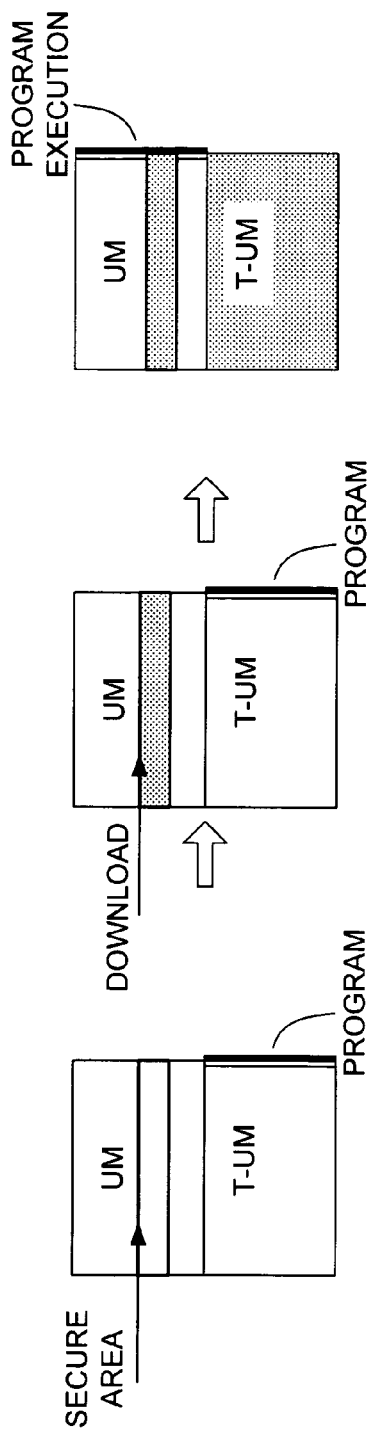
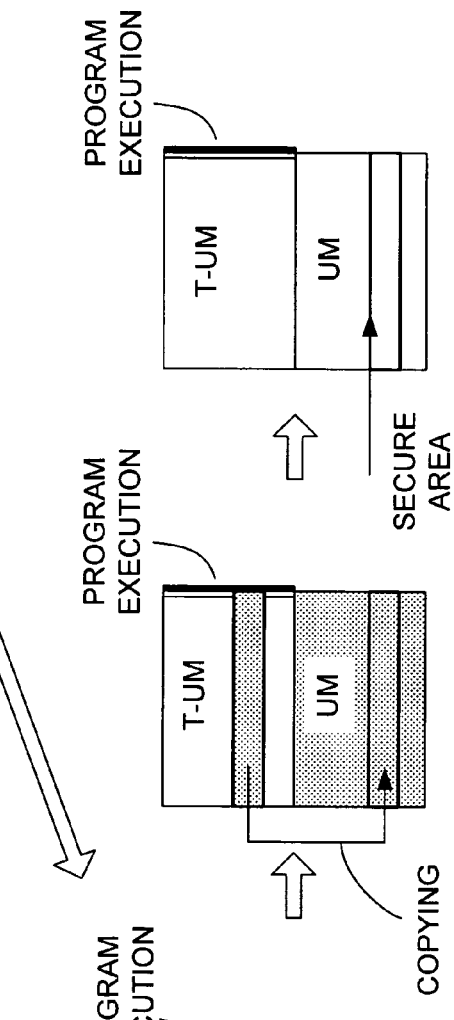
FIG. 10A  FIG. 10B  FIG. 10C
FIG. 10D  FIG. 10E  FIG. 10F

CONTROL SYSTEM AND METHOD FOR ON-LINE EDITING OF USER PROGRAM

BACKGROUND OF THE INVENTION

This invention relates to a control system and on-line editing of user program on a programmable controller.

Programmable controllers (PLC) are commonly being used as a control device in factory automation. A PLC is usually comprised of a plurality of units of various kinds combined appropriately together. Examples of such constituent units include a power source unit serving as a power source, a CPU unit for controlling the PLC as a whole, an input unit for inputting signals from switches and sensors that are installed at appropriate positions on a production machine or the like of the factory automation, an output unit for transmitting control outputs to actuators or the like and a communication unit for carrying out processing to a communication network such as carrying out data communications with a programming tool, a monitoring host apparatus and other PLCs.

The control operations by a CPU unit of a PLC starts with an initialization process and then the signals received by the input unit are taken into the I/O memory of the CPU unit (the so-called IN-refresh process). Next, logical calculations are performed on the basis of a user program which is created by using a preliminarily registered program-writing language such as the ladder language and preliminarily registered in a memory (the calculation process), and after the results of this calculation process are transmitted to the output unit by writing them in the I/O memory (the OUT-refresh process), the so-called peripheral service processes are carried out. These processes are thereafter repeated in a cyclic manner but the sequence in which the processes after the initialization is done may be varied. For example, the OUT-refresh and IN-refresh processes (together referred to as the I/O refresh process) may be done first, followed by the calculation process and the peripheral service processes, in this order. In such a case, the first OUT-refresh process will be only for outputting the fixed values resulting from the initialization and the outputting of the calculation results will start from the OUT-refresh process in the next cycle. As another example, the cyclic operation may be in the order of the calculation process, the I/O refresh process and the peripheral service process. In this case, the first calculation process will be carried out on the basis of the fixed values obtained by the initialization process and calculations on the basis of IN data taken in by the IN-refresh process will start from the second cycle of operations.

User programs are created and edited by using a programming tool connected to the PLC through a network. A user program which has been created or edited is downloaded from the programming tool to the PLC and stored in the user memory of the CPU unit. Such a user program includes a logical circuit with a plurality of input joints by means of a ladder program formed with the ladder language. The user program may include as its constituents function blocks, each representing a group of operations as a block. A function block is an assembly of a plurality of calculation circuits made into one component.

There are situations where something wrong may be discovered in a program or something wrong may happen in the operation even after a user program is executed (in the calculation process of the aforementioned cyclic operations) by the CPU unit of a PLC and the production equipment or the like has actually started to operate. In such a situation, the user program must undergo an editing process including additions, deletions and changes. One of the ways to edit a user program in such a situation is the so-called on-line editing where the program is edited while the control by the PLC is being carried out.

A conventional on-line editing method has been to use a programming tool to temporarily add a command such as a jump command immediately before the portion of the user program to be edited. When the PLC carries out the user program, the portion to be edited is thus skipped such that the operation can be continued without stopping the PLC. In the meantime, by this conventional method, a tool is used to carry out the editing of the skipped portion of the program by carrying out adding, deleting and making changes. Japanese Patent Publication Tokkai 2001-142510, for example, disclosed such a technology.

With such a prior art method of on-line editing, it is relatively easy to edit one circuit by one process but it is difficult to correct at once ladder circuits scattered at a plurality of different positions within a user program because it is extremely cumbersome to add a jump command temporarily to each of the plurality of portions of the user program to be edited. Moreover, such jump commands that have been temporarily added must be removed after the editing is completed and this makes the work even more cumbersome. If even one of these temporarily added commands fails to be removed, the edited program will not operate normally.

Conventional on-line editing methods, furthermore, could not work on function blocks. A function block is seldom stored together at one place in a user program. More often than otherwise, function blocks are stored scattered at a plurality of different positions. This is both because the constituent elements of a function block are like subroutine programs to a main ladder program and comprise an instance and a body and because they are usually stored scattered at a plurality of different positions. Thus, if a conventional method of editing an ordinary circuit is applied to a function block, many jump commands will have to be inserted and both the work of inserting these jump commands and that of removing these inserted jump commands after the editing are extremely cumbersome.

Problems about function blocks will be explained further in detail. As will be explained more in detail below with reference to FIG. 8, the user program memory area for storing a user program is divided into a function block recording part (with recording areas) for storing a plurality of body parts of function blocks and a program recording part (with recording areas) for storing, if the ladder program part and function blocks of a main program are inserted, instances that specify input and output of function blocks corresponding to the inserted function blocks. Thus, to edit a function block means to simultaneously edit the instance portions of the input and the output and the body portions of the actual function blocks at the different positions. Thus, the work of inserting and removing jump commands becomes extremely cumbersome, as in the case of editing a plurality of parts of the ladder circuit of a main user program, as described above.

Another problem with the on-line editing is that the portion of the user program being edited is not processed because it is skipped by a jump instruction, and hence if a portion of the program which is indispensable to the control is edited, there is likely to be an adverse effect on the operations of the PLC and accordingly also the operations of the production equipment or the like. In other words, the on-line editing cannot be carried out freely and indiscriminately on any portion of a program.

SUMMARY OF THE INVENTION

It is therefore an object of this invention to provide a CPU unit capable of carrying out on-line editing no matter on what portion of a user program and even where there are many portions to be edited (inclusive of the on-line editing of a function block), as well as such a method of editing a user program.

A control system according to this invention comprises a programmable controller including a CPU unit that carries out cyclic operations of I/O refresh, execution of a user program and peripheral service processes and a programming tool with the functions of uploading and downloading the user program from and to the programmable controller as well as editing the user program. The CPU unit not only includes two memories for storing the user program but also has some specified functions including:

(1) the function of selecting, when the programming tool carries out an editing process on the user program while the CPU unit is carrying out its cyclic operations, the user program stored in either one of the two memories as the object of execution;

(2) the function of outputting the user program stored in the selected one of the two memories (the "selected memory") to the programming tool while the CPU is in the phase of its cyclic operations where the peripheral service processes are being carried out, such that the programming tool is uploaded;

(3) the function of storing, while the CPU is in the phase of its cyclic operations where the peripheral service processes are being carried out, a user program downloaded from the programming tool in the other of the two memories (the "other memory") not storing the user program being executed;

(4) the function of switching the user program stored in the other memory, after the storing of the downloaded user program in the other memory has completely been done, to be the object of execution; and (5) the function of copying the user program stored in the other memory to the selected memory and storing it therein.

The invention relates also to a CPU unit as described above.

The invention further relates to a method of editing a user program of a programmable controller by using a programming tool. The programmable controller for this method is presumed to be connected to a CPU unit having two memories for storing a user program and adapted to carry out cyclic operations of I/O refresh, user program execution and peripheral service processes, and the method of this invention may be characterized as comprising the steps of preliminarily storing the user program in these two memories with same contents, selecting the user program stored in a selected one of these two memories (the "selected memory") as the object of execution before the user program is edited with the programming tool and continuing the cyclic operations by the CPU unit, uploading a user program stored in either of the two memories (either the selected memory or the other memory) with the programming tool while the CPU unit is in operation, and editing the uploaded user program with the programming tool, downloading the edited user program, after the step of editing is completed and while the CPU unit is in operation, to the other of the two memories (the "other memory") and storing the downloaded user program with the programming tool, causing the CPU unit, after the step of downloading is completed, to switch the object of execution from the user program in the selected memory to the user program in the other memory and to execute the edited user program wherein the CPU unit is arranged to execute the edited user program, and causing the CPU unit to store the edited user program of the other memory to the selected memory, thereby causing the two memories to store user programs with same content.

The invention relates still further to a method of processing with a programmable controller by using a programming tool. The programmable controller for such a method is characterized as having two memories for storing a user program and adapted to carry out cyclic operations of I/O refresh, user program execution and peripheral service processes, and the method may be characterized as comprising the steps of preliminarily having these two memories to store user programs with same contents, selecting the user program stored in a selected one of the two memories (the "selected memory") as the object of execution and arranging such that the programming tool can write only into the other of the memories (the "other memory"), transmitting to the programming tool the user program stored in either of these two memories (either the selected memory or the other memory) while the programming controller is carrying out the peripheral service processes in its cyclic operations, storing the user program from the programming tool in the other memory while the programming controller is carrying out the peripheral service processes in its cyclic operations, switching the object of execution from the selected memory to the other memory and causing the user program stored in the other memory to be executed, and storing the user program stored in the other memory into the selected memory and causing the user programs in the two memories to have same contents.

When an on-line editing process is carried out on, since the user program is stored in two memories with the same contents, one of the memories can be used for execution while the other of the memories is being edited. In other words, since the program being executed by the CPU unit is not itself being edited, the calculation process can be carried out without any limitations. When the on-line editing is completed, a switchover is made such that the memory which was being used for the editing is made the next object of execution such that the calculation can be started immediately on the program which has been edited.

BRIEF DESCRIPTION OF THE DRAWINGS

FIGS. 7A, 7B, 7C and 7D are drawings for showing the function of the MPU for the addition of a function block.

FIGS. 10A, 101B, 10C, 10D, 10E and 10F are drawings for showing the function of the MPU for the addition of a function block according to another embodiment of the invention.

DETAILED DESCRIPTION OF THE INVENTION

Figure 1:
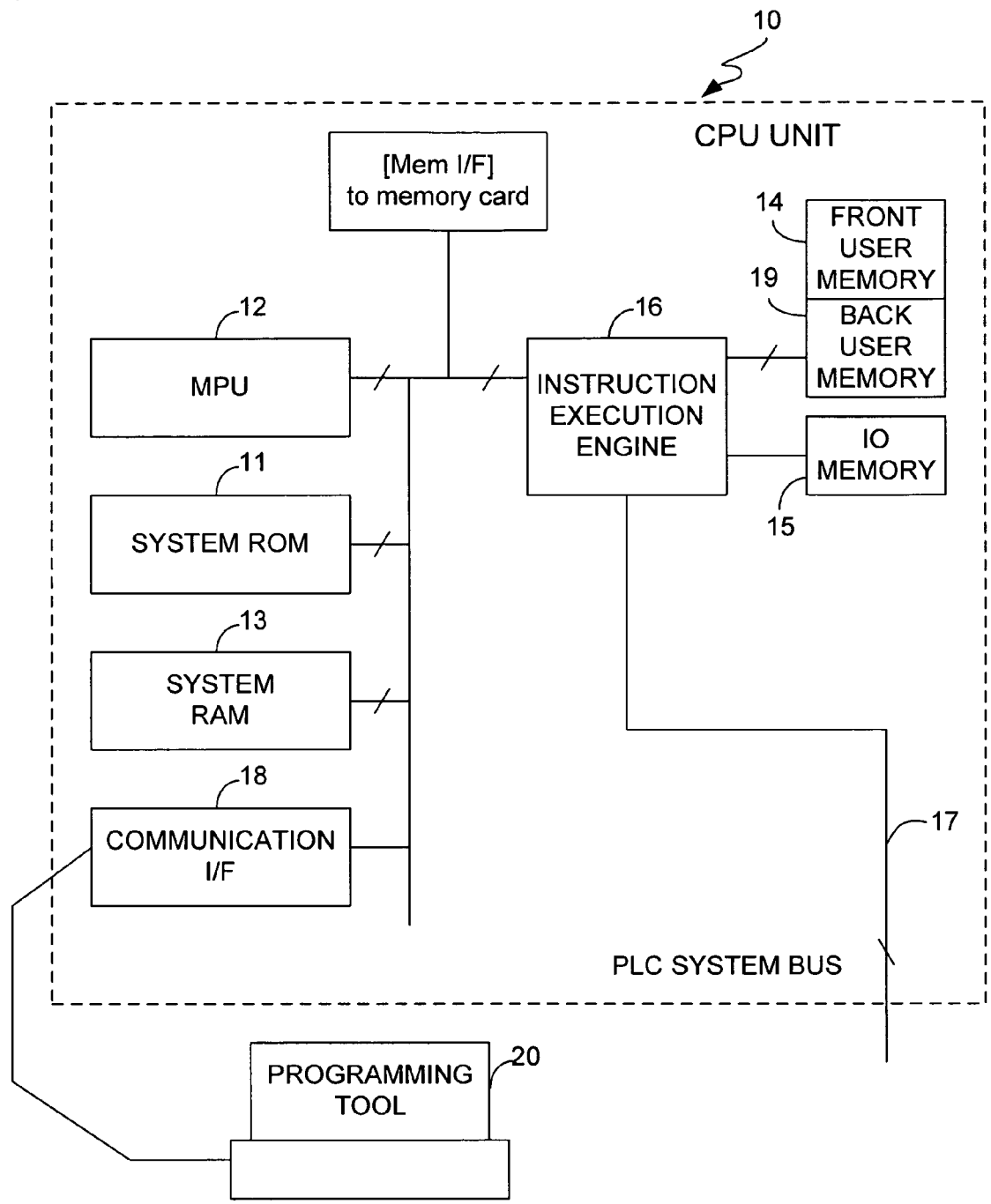
FIG. 1 is a block diagram of an example of CPU unit embodying this invention.

The invention is described next by way of an example. FIG. 1 shows a CPU unit 10 embodying this invention, serving as one of the constituent units of a PLC. The system program for carrying out the cyclic operations of the CPU unit 10 is stored in a ROM (the "system ROM") 11. It is an MPU 12 that carries out specified operations according to the system program in the system ROM 11 while appropriately making use of a system RAM 13 serving as a work memory. A user program which has preliminarily been created by the user by using a programming tool is stored in a user memory 14. I/O data and parameters to be used in the logical calculation when the user program is executed are stored in an IO memory 15. During the IN-refresh process prior to the execution of the user program, the CPU unit 10 takes in IN data from an I/O unit (not shown) connected through a PLC system bus 17. The CPU unit 10 carries out its calculation process on the basis of these IN data and outputs the results of this calculation process as its output data to the I/O unit by its OUT-refresh process.

Execution of a user program by the CPU unit 10 is actually carried out by the MPU 12 and an instruction execution engine (ASIC) 16. When the execution process of a user program is started, the MPU 12 causes the instruction execution engine 16 to sequentially call out and execute the user program (instruction object code) stored in the user memory 14. In response to this instruction, the instruction execution engine 16 analyzes the instruction objects (such as an intermediate mnemonic code), references the instruction table of the instruction execution engine 16 and carries out the program instruction.

The instruction table serves to define basic instructions (such as logical AND and OR calculations and simple numerical calculations) that can be executed by the instruction execution engine 16 itself. Application instructions not defined by the instruction table (such as complicated computational controls) cannot be executed by the instruction execution engine 16 itself. In the case of such an application instruction, therefore, the instruction execution engine 16 transmits not only a request to carry it out but also the IN data and parameters necessary for the execution to the MPU 12. In other words, the instruction execution engine 16 and the MPU 12 share between them the burden of carrying out instructions so as to improve the work efficiency between the engine which can handle basic instructions well and the MPU 12 with expertise in handling application instructions.

As a variation, a single processor may be provided with the functions of both the instruction execution engine 16 and the MPU 12. As another variation, the instruction execution engine 16 may be designed so as to be able to carry out a portion of the application instructions. In the description of the invention that follows, it will be assumed that the user program can be executed by the instruction execution engine 16.

At the time of execution of a user program, the instruction execution engine 16 accesses the IO memory appropriately to read out IN data, to write in OUT data and to read out and obtain parameters. Numeral 18 indicates a communication interface for exchanging data with a tool 20 adapted to monitor the I/O data of the CPU unit 10 therethrough, to upload the user program stored in the user memory 14 and to download an edited user program to the user memory 14. This data-exchanging communication process with the tool 20 is carried out as a part of the peripheral service processes in the cyclic operations by the CPU unit 10.

Figure 2B:
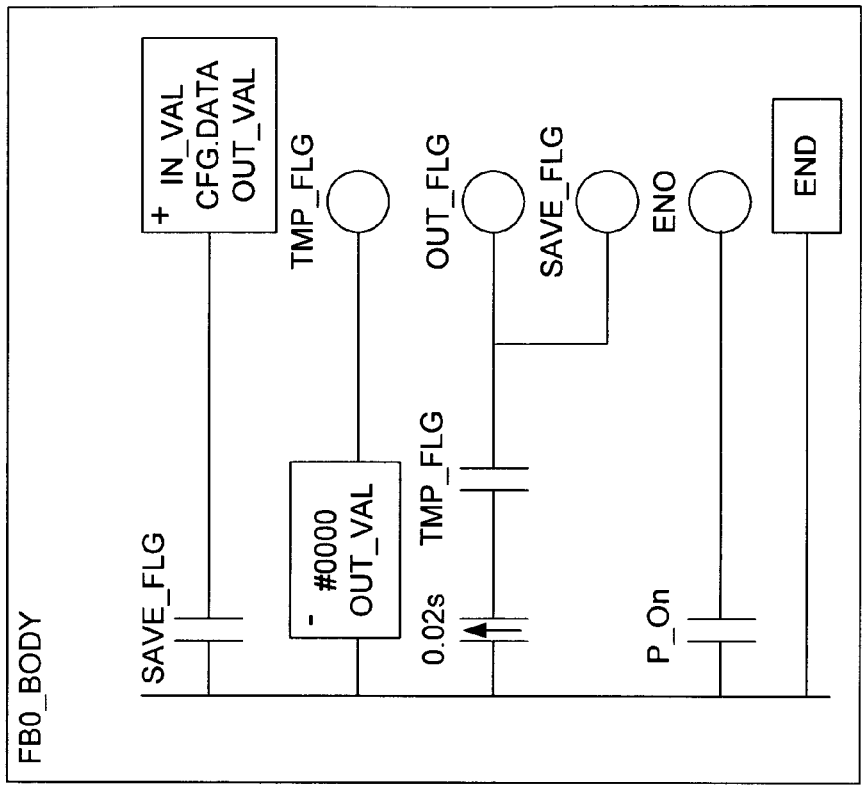
FIG. 2 is a block diagram for explaining function block.
Figure 2A:
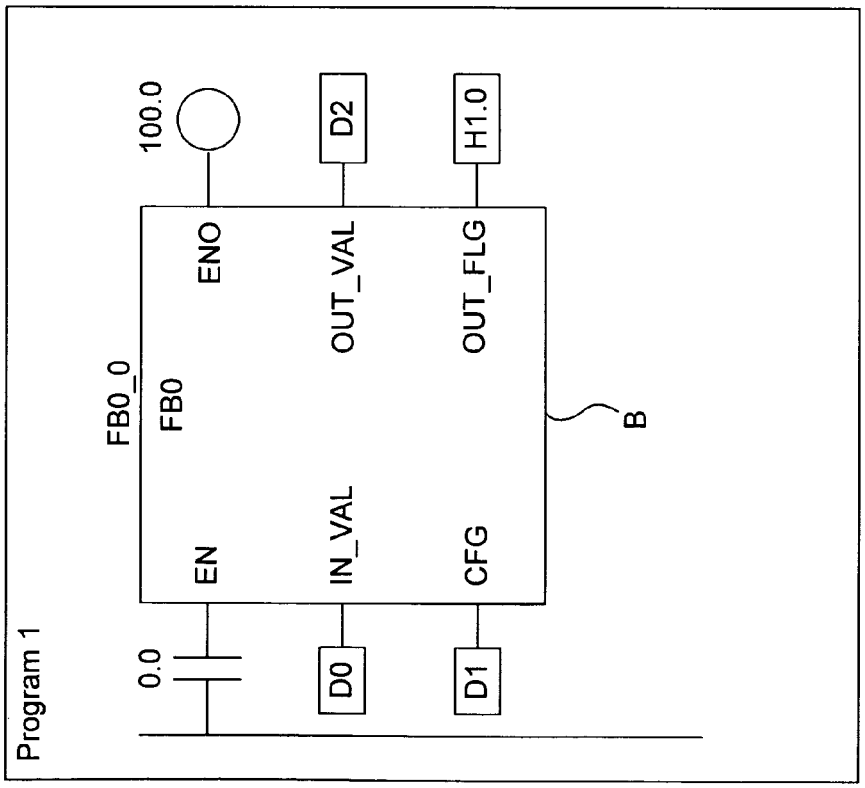

The PLC of this example is adapted to execute function blocks. FIG. 2A shows a portion of the main user program having a function block inserted in a ladder program. The function block is provided with input parameters (also referred to as arguments such as D0 and D1 shown in the example), output parameters (also referred to as return values such as D2, H1.0 shown in the example) and a body B which defines the calculation process to be actually carried out. The content of the body B may be as shown in FIG. 2B, for example, being a program written in the ladder language for carrying out a block of operations. The body B is indicated as a box in FIG. 2A and its content, as shown in FIG. 2B, is a program comprising a plurality of circuits. When it comes upon a function block during the execution of a user program, its body part is called and executed and the results of the execution are outputted as output parameters.

Figure 3:
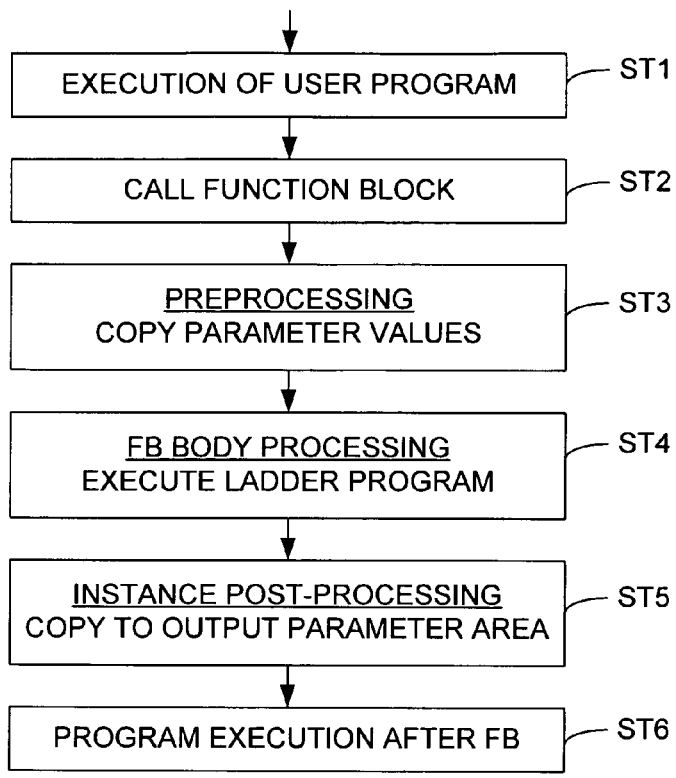
FIG. 3 is a flowchart of the execution of a ladder program containing a function block.

FIG. 3 is a flowchart of the execution of a user program. The instruction execution engine 16 of the CPU unit 10 carries out the user program of the user memory (UM) 14 sequentially from the top (Step ST1). If the user program contains a function block as shown in FIG. 2A and when it comes to the turn to execute such a function block, the instruction execution engine 16 calls the function block (Step ST2) and jumps to the corresponding function block recording areas of the function block recording part of the user memory for the preprocessing of instances.

In the preprocessing step, the values of the input parameters of the function block are read out of the IO memory 15 and copied into the function block execution area of the IO memory 15 (Step ST3). This is done because memory areas for the IN data and the OUT data for the function block are separately provided. Next, as a function block (FB) body processing, the instruction execution engine 16 makes reference to the function block execution area and executes the ladder program (such as shown in FIG. 2B) described in the body. The results of the execution are then stored in the function block execution area of the IO memory 15 (Step ST4).

Next, as the instance post-processing, the values of the results of execution stored in the function block execution area of the IO memory 15 are copied to the output parameter area and the processing of the function block portion is completed (Step ST5). Next, the instruction execution engine 16 makes reference to the user memory 14 again and executes the continuation of the main routine of the user program following this function block (Step ST6). The routine of processing for the execution of a function block itself is well known and hence no detailed account will be presented herein.

According to this invention, there is provided a temporary user memory (T-UM or "back memory") 19 in addition to the memory (UM or "front user memory" which, however, will be referred to simply as the user memory herein unless there is a likelihood of confusion) 14. The user memory 14 is for storing the user program during a normal operation, and the instruction execution engine 16 calls out the user program from this user memory 14 for execution. The area accessible to the programming tool 20 is the user memory 14. The temporary user memory 19 is not accessible to the programming tool 20. This is for the purpose of distinguishing between the area for referencing the user program and the area to be accessed by the programming tool 20. Explained more in detail, it is for the purpose of preventing the instruction execution engine 16, while it is executing the user program, from referencing the program just edited by the programming tool 20. The operation would become unstable if the instruction execution engine 16 were allowed to freely reference the edited program while executing the user program and the content of the program would be changed while it is being executed.

The temporary user memory 19 stores the same program as the user program stored in the user memory 14. At the time of an on-line editing, the instruction execution engine 16 does not reference the user memory 14 for the execution but calls out the user program stored in the temporary user memory 19. In this manner, a calculation process can be carried out stably and continuously on the basis of the user program with the same content as the program before the on-line editing even during an on-line editing.

Physically separate memories (memory elements) may be used for the front and back user memories 14 and 19. A single memory may be used with two separate areas assigned for the front and back user memories 14 and 19.

Figure 4:
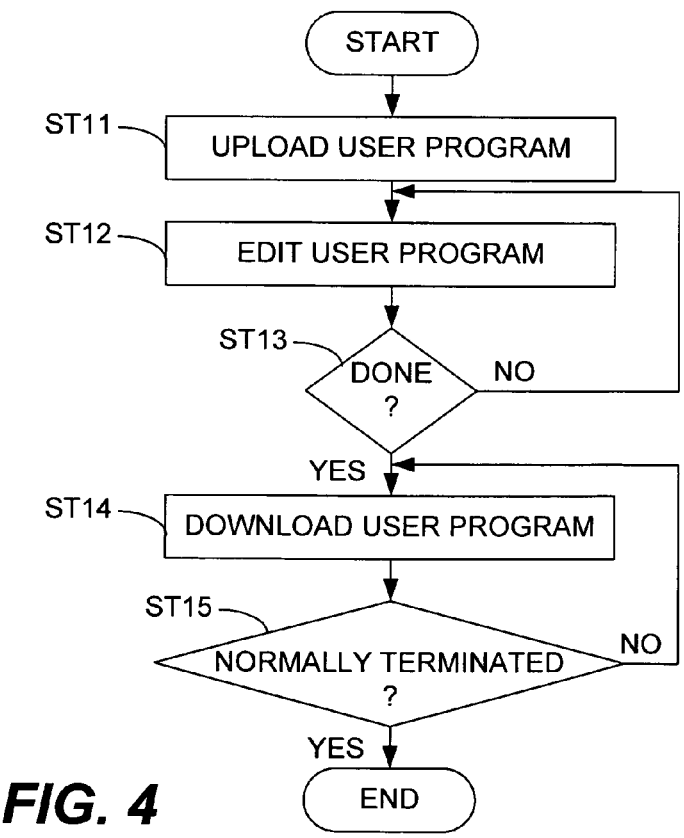
FIG. 4 is a flowchart for the downloading function by the MPU.

The operations and functioning of the tool 20 at the time of an on-line editing are explained next with reference to the flowchart of FIG. 4. Firstly, the user program to be edited is uploaded from the user memory 14 of the CPU unit 10 (Step ST11). At this moment, the CPU unit 10 is carrying out a process for the on-line editing. As will be explained more in detail below with reference to FIG. 6, however, it is the program stored in the temporary user memory 19 that the CPU unit 10 is carrying on its execution. Thus, it is preferable that the object of this uploading be the other (front) user memory 14 because it is safer to distinguish as clearly as possible between the memory referenced by the CPU unit 10 and the memory referenced by the programming tool 20.

Figure 5:
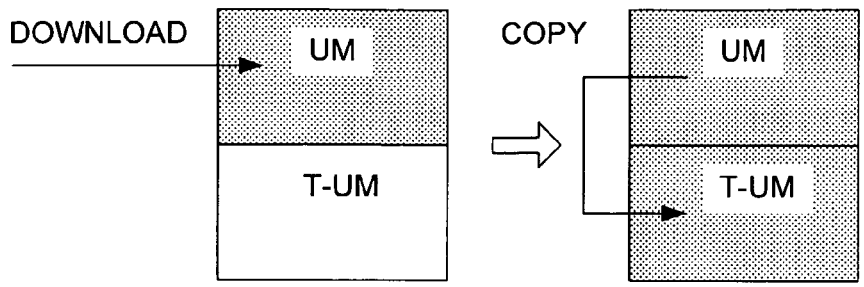
FIGS. 5A and 5B are drawings for explaining the downloading process by the MPU.

When the uploading is completed over all of the areas of the user memory 14 where the user program is stored, the user edits the user program by means of the tool 20 by making additions, deletions and changes (Step ST12). After the edition of the user program is completed (YES in Step ST13), the edited user program is downloaded from the tool 20 to the user memory 14 of the CPU unit 10 (Step ST14), as shown in FIG. 5. From the point of view of the CPU unit 10, this downloading is carried out during the period of peripheral service processes. If the amount of the program to be downloaded is too large, the downloading process may be divided into portions and carried out over a plurality of cycles of its operations.

The tool 20 then undertakes to determine whether the downloading has been terminated normally (Step ST15). This is done from the side of the PLC by self-examination. If the downloading has been completed, it is reported to the tool 20 to this effect and the tool 20 thereby concludes that the downloading has been completed normally. The self-examination by the PLC may be carried out, for example, by the MPU 12 checking the sum value of the code data stored in the user memory 14 to determine whether or not the download has been completed normally. If it is found that the downloading has not been completed normally, the tool 20 receives a report to this effect from the MPU 12 and thereupon executes the downloading step again.

Thereafter, the user program downloaded to the user memory 14 is copied to the temporary memory 19 to be stored. When the PLC carries out the aforementioned self-examination to determine whether the downloading has been completed, this process of copying and storing the user program is initiated by the determination by the MPU 12 that the downloading has been completed normally. In this case, the process of copying and storing is carried out while the user program is not being executed during the cyclic operations of the CPU unit 10, such as during the period when peripheral service processes are carried out.

As a variation, the tool 20 itself may be adapted to output to the MPU 12 an instruction to start the storage process to the user memory 14 and the copying and the storage processes to the temporary memory 19 as the tool 20 downloads the edited user program to the CPU unit 10, as shown in FIG. 5.

Figure 6:
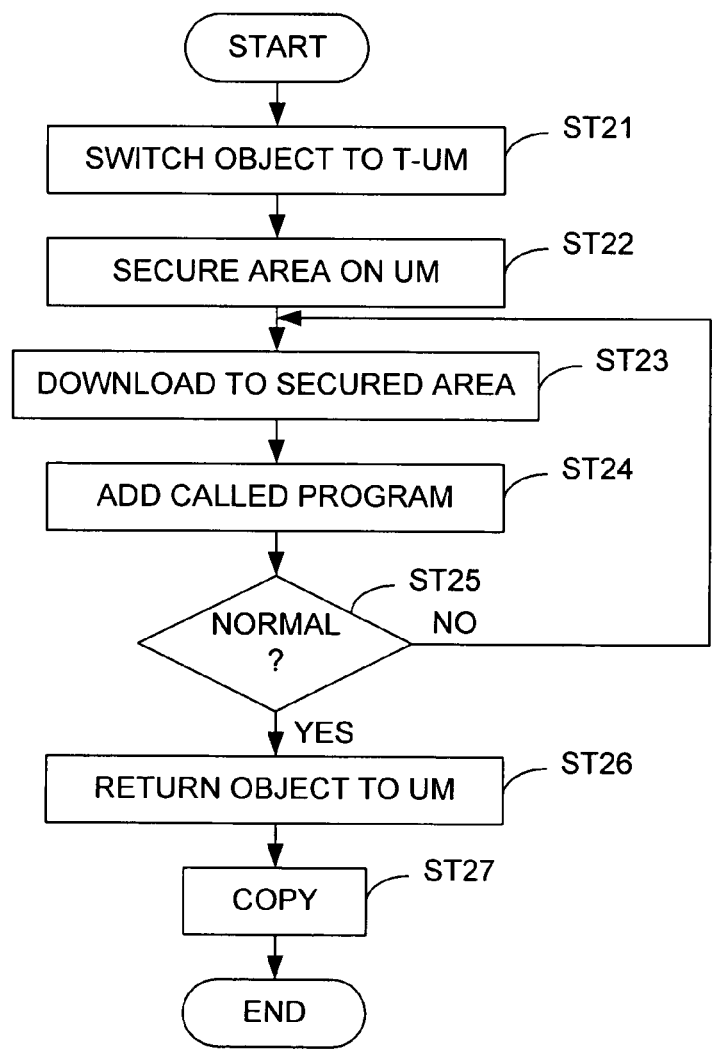
FIG. 6 is a flowchart for the function of the MPU for adding a function block.

FIG. 6 is a flowchart for the processing by the CPU unit 10 during an on-line editing for adding a function block. To start, before the tool 20 undertakes to upload the user program in order to carry out the on-line editing, the portion of the program to be executed by the instruction execution engine 16 of the CPU unit 10 is switched to the temporary user memory 19 (Step ST21). This may be accomplished by changing the flag for specifying whether the instruction execution engine 16 should be executing on the front or back user memory 14 or 19. Alternatively, the programming tool 20 may be made to automatically output an instruction signal to the CPU unit 10 to make a switch to the temporary user memory 19 for the instruction execution engine 16 to execute on when the on-line editing is to be carried out by the programming tool 20. After the switch in Step S21 is carried out, no matter by which method, the user program stored in the temporary user memory 19 is presented to the instruction execution engine 16 as the instruction object and an actual control is continued. Since the contents of the front and back user memories 14 and 19 match, the instruction execution engine 16 can continue to execute the user program with the same contents as it has been executing.

Next, the user program before it was edited, stored in the user memory 14, is entirely uploaded by means of the programming tool 20. (As a variety, only the portion to be edited may be uploaded.) This is accomplished while the CPU unit 10 is carrying out the peripheral service processes in its cyclic operations. If the user program is large, the transmission may be made to the tool 20 over a plurality of cycles of the peripheral service processes. On the part of the tool 20, the actual editing process on the user program (Step ST12 of FIG. 4) is started after this uploading transmission is completed.

Figure 8:
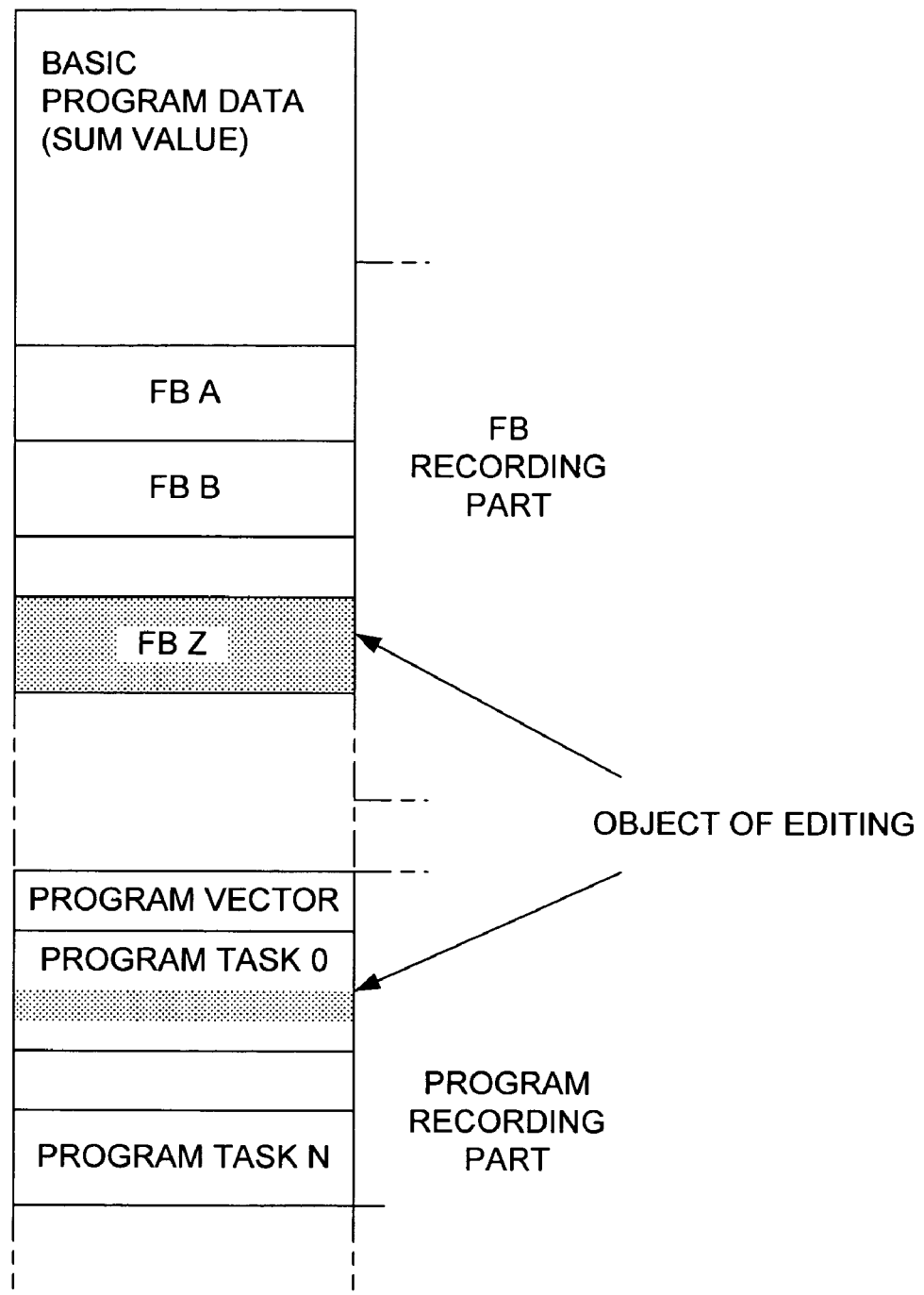
FIG. 8 is a schematic drawing for showing an example of memory map of the user memory.

Next, the MPU 12 secures a body program area for the function block to be added in the user memory 14 (Step ST22), as shown in FIG. 7A. The memory map of the user memory 14 includes an area in front for storing basic data of the program such as the sum value, as shown in FIG. 8, followed by a function block (FB) recording part for recording the program data of the function block body part and a program recording part for storing the instances of the user program and the accompanying function blocks. In Step ST22, an unused area of the FB recording part is specified as a recording area for the function block to be added.

Figure 9B:
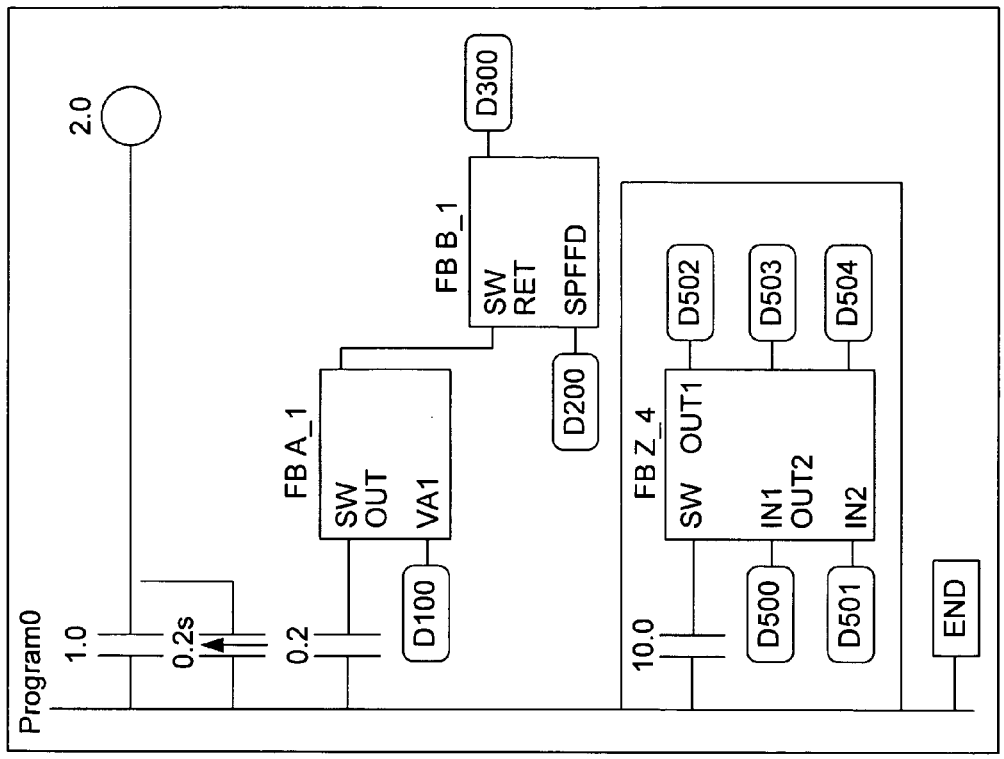
FIGS. 9A and 9B are drawings for showing the addition of a function block.
Figure 9A:
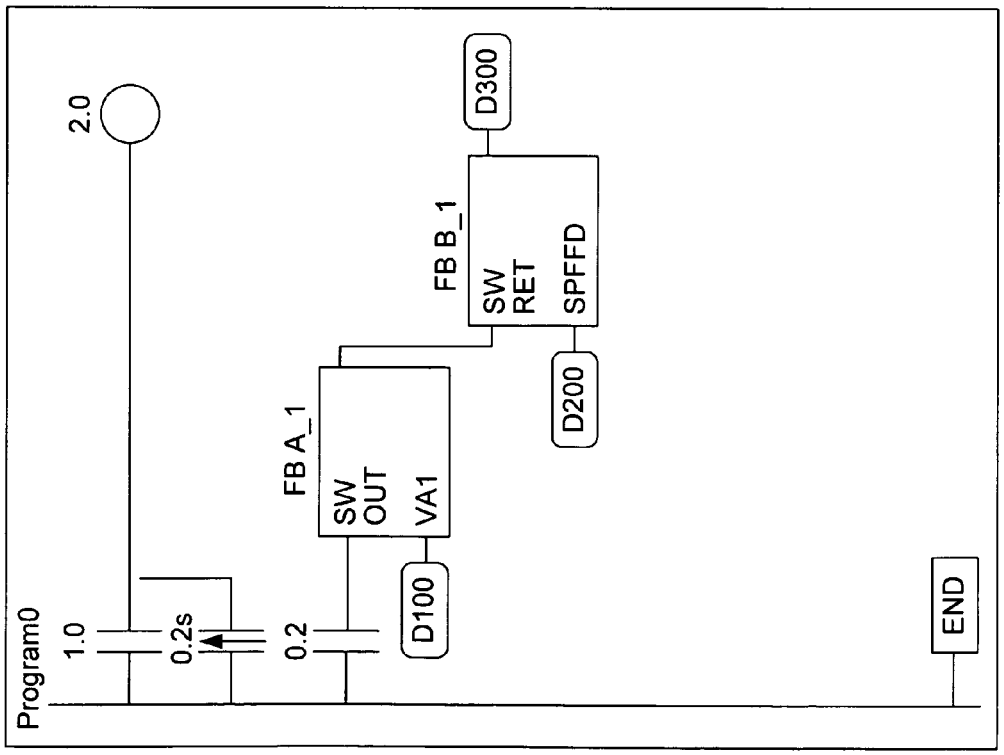

Consider an example where a user program is to be edited such that a new function block FB Z_4 is added at a specified position as shown in FIGS. 9A and 9B. For this purpose, the MPU 12 specifies and secures an area in the FB recording part for writing in FB Z_4 to be newly added. Since the FB recording part is partitioned from the beginning as shown in FIG. 8 such that a plurality of function blocks can be written in them, and function blocks are already stored in them sequentially in the ascending order of their addresses. So, a new area for the new function block may be secured by identifying the partition that is not occupied yet and has the youngest address and securing it.

After an area for recording the new function block to be added is thus identified, this function block is edited by means of the tool 20. At the same time, a program for calling the starting address of the corresponding recording area of the FB recording part secured for this function block to be added is written in at the position within the user program where the function block to be added is executed (or the corresponding recording area of the program task of the program recording part). This call program may be manually obtained every time by the user or it may be automatically done by the tool function. In such a case, since the tool 20 is already informed of the start address when the FB recording area is secured, this information may be used to create the call program automatically.

When the editing process on the user program (inclusive of addition of function blocks and instantation of instances) is completed, body blocks of the added function blocks corresponding to the secured FB recording area of the user memory 14 are downloaded to the programming tool 20. The received FB body blocks are stored in the secured areas of the user memory 14 by the MPU 12. Next, the call program for calling added function block recording areas (or the function block recording area specified and secured this time) in the user program corresponding to the program recording area of the user memory 14 is downloaded from the tool 20, and the MPU 12 stores them similarly in the secured areas (Steps ST23 and ST24), as shown in FIG. 7B.

In the above, although a situation where only the edited portion is downloaded and stored was explained, the entire edited user program (inclusive of the portions that have not been edited) may be downloaded as an alternative example from the tool 20 to the user memory 14. From the point of view of the CPU unit 10, this process of downloading the edited program from the tool 20 to the user memory 14 is a process done by the MPU 12 through the communication I/F 18 and is done as a part of the peripheral service processes in its cyclic operations.

Next, the MPU 12 references the basic data of the program in the user memory 14 and determines whether or not the downloading has been completed normally, say, by checking a sum value (Step ST25). As an alternative, however, this process may be carried out by the tool 20, instead of by the MPU 12. In such a case, it is the tool 20 that reads out the basic data of the program in the user memory 14 and checks the sum value.

If the MPU 12 determines that the downloading has been normally completed (YES in Step ST25), the user program recorded in the user memory 14 changes from the condition shown in FIG. 9A to the new condition shown in FIG. 9B. Next, the MPU 12 switches the object of program execution by the instruction execution engine 16 from the temporary user memory 19 to the (front) user memory 14 (Step ST26), as shown in FIG. 7C. As a result of this switching operation, the instruction execution engine 16 starts to execute the edited user program in the (front) user memory 14.

In the case where it is the tool 20 that determines whether or not the downloading has been completed normally, it is also the tool 20 that outputs a switch instruction to the CPU unit 10. This may be done by way of the flag described above. This switching operation, too, is done when the CPU unit 10 is not engaged in the calculation process and, say, during its peripheral service processes.

Next, the MPU 12 serves to copy the content of the front user memory 14 to the temporary user memory 19 (Step ST27) as shown in FIG. 7D. Since the copying of the entire user program cannot be accomplished all at once, it is done in portions during the peripheral service processes during the cyclic operations of the PLC. At the end, the temporary user memory 19, too, comes to store the edited user program. Thus, as the object of processing by the instruction execution engine 16 is switched from the front user memory 14 to the temporary user memory 19 at the time of the next on-line editing, the temporary user memory 19 can be distinguished from the front user memory 14 accessed by the tool 20, the instruction execution engine 16 can stably resume the execution of the user program at that point in time.

If the instruction execution engine 16 is of a type capable of handling a wider range of processing, it may undertake in response to an instruction from the MPU 12 to carry out processes of receiving the downloaded user program and storing it in the front user program 14, switching between the front and back user memories 14 and 19 for referencing and copying the edited user program from the front user memory 14 to the temporary (back) user memory 19. In the case where a single processor is provided with the functions of both the MPU 12 and the instruction execution engine 16, these processes will be carried out by such a processor.

Although the invention was described above for the addition of a function block, it now goes without saying that the deletion of a function block can be done similarly. The process is also similar for editing a plurality of portions of an ordinary ladder calculation part of a main user program. The present invention is applicable even if there is only one program to be edited. In any case, the program to be executed is transferred to a temporary user memory such that the on-line editing done to the user program in the front user memory (inclusive of the downloading and uploading processes) does not affect the execution of the program because the instruction execution engine 16 makes reference to memory areas different from those accessed by the tool 20.

Although an example was described above wherein the object of execution by the instruction execution engine 16 is switched at the beginning of an on-line editing (as shown by Step S21 of FIG. 6), this is not intended to limit the scope of the invention. Instead, the definitions for the handling of the user memories may be preliminarily changed.

According to this embodiment of the invention, the memory which is being referenced by the instruction execution engine when an on-line editing process is carried out is defined as the reference memory (temporary memory), while the other memory storing the same user program and not currently being referenced by the instruction execution engine is defined as the editing memory, as shown in FIG. 10A. After the user program has been edited, the edited user program is downloaded to and stored in this editing memory, as shown in FIG. 10B. After this downloading process, the object of referencing by the instruction execution engine is switched from the reference memory to the editing memory such that the instruction execution engine will begin to reference the edited user program, while the reference memory at this moment stores the user program before the editing, as shown in FIG. 10C. The steps up to here are the same as explained above with reference to FIGS. 7A, 7B and 7C.

Next, the definitions of the two user memories are interchanged, that is, what has been defined as the reference memory is now defined as the editing memory and what has been defined as the editing memory is now defined as the reference memory, as shown in FIG. 7D. This makes the tool to become unable to access the newly redefined reference memory. Since the redefined editing memory does not yet store the edited user program, the edited program stored in the reference memory is next copied into the editing memory, as shown in FIG. 10E.

At the time of the next on-line editing, the tool edits the program in the redefined editing memory by securing a body area in this editing memory and downloading the edited program there, as shown in FIG. 10F. After the downloading, the object of reference by the instruction execution engine is changed as explained above, the memories are redefined again and the edited program is copied and stored. Since the memory accessed by the tool and the memory referenced by the instruction execution engine can thus be distinguished, the instruction execution engine can stably continue to execute the user program.

The invention does not require, however, that the user memory 14 be the only memory accessible by the programming tool 20. According to still another variation of the embodiment, since the two memories contain user programs of the same content when the programming tool 20 is about to upload the user program, it may be done from the memory being referenced by the instruction execution engine 16 because the content of the memory does not change simply by this uploading operation (or the readout operation). In other words, at the time of the uploading, it does not matter whether the programming tool 20 accesses the memory being referenced by the instruction execution engine 16 or the other memory not being thus referenced. At the time of downloading the edited program, however, it must be done to the memory not being referenced by the instruction execution engine 16 since downloading means rewriting.

It is also to be reminded that the present invention is not limited to programmable controllers having a plurality of units of various kinds such as a power source unit, a CPU unit, an input unit, an output unit and a communication unit combined together. The invention also includes single-unit type PLCs referred to as micro-PLCs having a single unit that integrates all functions of these individual units. The present invention is applicable also to such PLCs.

What is claimed is:

1. A control system comprising:
   a programmable controller including a CPU unit that carries out cyclic operations of I/O refresh, user program execution and peripheral service processes; and
   a programming tool that connects with said CPU unit through a communication interface and edits said user program;
   wherein said programming tool has the functions of uploading and downloading said user program from and to said programmable controller; and
   wherein said CPU unit includes two memories for storing said user program and has the functions of:
   selecting one of said two memories, when said programming tool carries out an editing process on said user program while said cyclic operations are being carried out, and the user program stored in said selected memory to be the object of execution;
   uploading said programming tool and thereby outputting the user program stored in selected one of said two memories to said programming tool while said peripheral service processes are being carried out;
   storing, while said peripheral service processes are being carried out, a user program downloaded from said programming tool in the other of said memories not storing a user program being executed;
   switching the user program stored in the other memory, after the downloaded user program has completely been stored in the other memory, to become executed; and
   copying and storing the user program that has been downloaded from said programming tool and is stored in the other memory to and in the selected memory.

2. The control system of claim 1 wherein said CPU unit further has the function of further switching the object of execution from the user program stored in the other memory to the user program stored in the selected memory when said programming tool edits the user program stored in the other memory while said cyclic operations are being carried out.

3. A CPU unit adapted to upload and download a user program between a programming tool that connects with said CPU unit through a communication interface and to carry out cyclic operations of I/O refresh, user program execution and peripheral service processes; said CPU unit comprising two memories for storing said user program and having the functions of:
   selecting one of said two memories, when said programming tool carries out an editing process on said user program while said cyclic operations are being carried out, and the user program stored in said selected memory to be the object of execution;
   uploading said programming tool and thereby outputting the user program stored in selected one of said two memories to said programming tool while said peripheral service processes are being carried out;
   storing, while said peripheral service processes are being carried out, a user program downloaded from said programming tool in the other of said memories not storing a user program being executed;
   switching the user program stored in the other memory, after the downloaded user program has completely been stored in the other memory, to become executed; and
   copying and storing the user program that has been downloaded from said programming tool and is stored in the other memory to and in the selected memory.

4. A method of editing a user program of a programmable controller by using a programming tool, said programmable controller being connected to a CPU unit having two memories for storing a user program and adapted to carry out cyclic operations of I/O refresh, user program execution and peripheral service processes, said programming tool being connected to said CPU unit through a communication interface; said method comprising the steps of:
   preliminarily storing said user program in said two memories with same contents;
   selecting the user program stored in a selected one of said two memories as the object of execution before said user program is edited with said programming tool and continuing said cyclic operations by the CPU unit;
   uploading a user program stored in either of said two memories with said programming tool while said CPU unit is in operation, and editing said uploaded user program with said programming tool;
   downloading the edited user program, after said step of editing is completed and while said CPU unit is in operation, to the other of said two memories and storing said downloaded user program with said programming tool;
   causing said CPU unit, after said step of downloading is completed, to switch the object of execution from the user program in said selected memory to the user program in the other memory and to execute the edited user program wherein said CPU unit is arranged to execute the edited user program; and causing said CPU unit to store the edited user program of the other memory to the selected memory thereby causing said two memories to store user programs with same content.

5. The method of claim 4 wherein said steps of uploading and downloading are from and to the memory storing the user program being executed by said CPU unit in said cyclic operations.

6. The method of claim 4 wherein said steps of uploading and downloading are executed while said CPU unit is executing said peripheral service processes.

7. The method of claim 4 wherein said CPU unit, when the user program is edited next by said programming tool, switches the object of execution from the other memory to the selected memory and maintains the object of execution thus switched until the downloading of the edited user program is completed.

8. The method of claim 4 wherein
said CPU unit, when the user program is edited next by said programming tool, keeps the object of execution unchanged from the other memory and continues to carry out said cyclic operations;
said programming tool, after said step of editing is completed and while said CPU unit is carrying out said cyclic operations, downloads the edited user program to the selected memory to be stored; and
said CPU unit, after said edited user program is stored, switches the object of execution from the other memory to the selected memory and executes the newly edited user program.

9. A method of processing with a programmable controller by using a programming tool that connects with said programmable controller through a communication interface, said programmable controller having two memories for storing a user program and adapted to carry out cyclic operations of I/O refresh, user program execution and peripheral service processes; said method comprising the steps of:

preliminarily having said two memories to store user programs with same contents;

selecting the user program stored in a selected one of said two memories as the object of execution and arranging such that said programming tool can write only into the other of said memories;

transmitting to said programming tool the user program stored in either of said two memories while said programming controller is carrying out said peripheral service processes in said cyclic operations;

storing the user program from said programming tool in said the other of said memories while said programming controller is carrying out said peripheral service processes in said cyclic operations;

switching the object of execution from said one of said memories to said the other of said memories and causing the user program stored in said the other of said memories to be executed; and storing the user program stored in said the other of said memories in said one of said memories and causing the user programs in said two memories to have same contents.

* * * * *